(12) United States Patent
Lim et al.

(10) Patent No.: US 6,983,341 B1
(45) Date of Patent: *Jan. 3, 2006

(54) MODULAR PERIPHERAL DEVICE HUB

(75) Inventors: Wai-Loong Lim, Menlo Park, CA (US); Jason Ivan, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/153,462

(22) Filed: May 21, 2002

(51) Int. Cl.
*G06F 13/14* (2006.01)
*H01R 13/502* (2006.01)

(52) U.S. Cl. .................................. 710/305; 439/701
(58) Field of Classification Search ............... 710/305; 439/701
See application file for complete search history.

(56) References Cited

U.S. PATENT DOCUMENTS

| 5,761,459 | A | * | 6/1998 | Schnoor et al. ............. 710/305 |
| 6,462,953 | B2 | * | 10/2002 | Tong et al. ................. 361/732 |
| 6,607,408 | B2 | * | 8/2003 | Milan ....................... 439/752.5 |
| D484,136 | S | * | 12/2003 | Ivan et al. .................. D14/433 |
| 6,662,259 | B1 | * | 12/2003 | Lin et al. .................... 710/313 |

OTHER PUBLICATIONS

James Little, Belkin First to Market with Its New USB 2.0 High-Speed 4 -port Hub; Highly Anticipated Products Is Now Shipping!, Nov. 21, 2001,web.archive.org/web/2001122203124/http://www.belkin.com/.*
James Little, Belkin First to Market with Its New USB 2.0 High-Speed 4 -port Hub; Highly Anticipated Products Is Now Shipping Nov. 21, 2001,web.archive.org/web/2001122203124/http://www.belkin.com/.*
F5U221 datasheet,web.archive.org/web/2001122203124/http://www.belkin.com/.*

* cited by examiner

*Primary Examiner*—Tim Vo
*Assistant Examiner*—Christopher Daley
(74) *Attorney, Agent, or Firm*—Martine Penilla & Gencarella, LLP

(57) ABSTRACT

A hub for expanding peripheral device connectivity in a computer system is provided. The hub includes a hub body which has a front side, a back side, and peripheral surfaces. The peripheral surfaces include a top peripheral surface, a bottom peripheral surface and a pair of side peripheral surfaces. A plurality of connection ports are defined in the bottom peripheral surface. Each of the plurality of connection ports enables the connection of cables. A stand is defined by a shaft that extends between a first shaft end and a second shaft end. The first and second shaft ends attach to the hub body at each of the pair of side peripheral surfaces to support the hub body in a semi-vertical orientation. The stand includes an integral loop for holding the cables that extend away from the plurality of connection ports.

17 Claims, 5 Drawing Sheets

MODULAR PERIPHERAL DEVICE HUB

BACKGROUND OF THE INVENTION

1. Field of the Invention

The present invention relates generally to computer devices and systems, and more particularly to methods and apparatus facilitating and expanding computer and computer system connectivity.

2. Description of the Related Art

As computer systems have grown larger, faster, and more reliable, so too have typical users grown more sophisticated, more numerous, and more demanding. Computer systems, tools, and capabilities have realized dramatic advances in the constant struggle to meet the growing needs and desires of the evolving "typical" computer user. One example of a dramatic advance is the capacity of a computer system to power and process a plurality of both discrete and integrated devices exploiting the computational and logical functions of computer systems from basic to advanced. Specific systems continue to evolve for specialized use ranging from individual desktop systems, to networked workstations, to network servers, cluster servers and beyond. Applications demand more and faster resources to manage, produce, and process data at individual systems, at work stations, across networks, and across the World Wide Web. Often, resource is required beyond a basic computer system to such peripheral devices as supplemental hard disk drives, high volume storage media, CD-RW devices, DVD read and record devices, standard and specialized printers, scanners, digital video and photographic processors, and the like.

One way to increase the number of discrete and integrated devices available to a computer is to increase the connectivity of the computer. In general, connectivity refers to the capability of a computer system to access and utilize multiple peripheral devices for processing and managing data in multiple formats. Two aspects of connectivity that can both limit and enable the connectivity of a computer or computer system are the capacity of the computer or computer system to access and utilize multiple peripheral devices, and the speed at which the computer or computer system can process and manage data in multiple formats.

Computer systems typically provide various options for connecting to and utilizing peripheral devices. One method to increase connectivity of computer systems is configuration with expansion slots capable of receiving a variety of circuit boards that have various functions. Among the type of circuit boards which may be inserted include network interface cards (NICs) which allow the computer to connect to a network, and host adapters which allow computer systems to be configured with one or more local peripheral devices. Once peripheral devices are connected to the host adapter and appropriately configured, the peripheral devices are integrated into the computer system.

Another increasingly popular option for increasing the connectivity of computer systems is a Universal Serial Bus (USB). The USB is rapidly becoming the most common interface for high-speed data in typical consumer computer systems. USB generally replaces the myriad of serial and parallel connectors found on typical computers with one generally standardized plug and port combination. The advent of the USB ushered out the days of removing a computer case to install a new card and suffering through the complexities of setting and adjusting onboard switches. The USB host controller is integrated into the motherboard, and one or more USB ports can be found on the back, as well as other locations, of most recent computers.

The many advantages of USB include plug and play integration with computer operating systems, the ability to hot swap USB devices, the capacity for a plurality of devices connected through one or more hubs into a single port connection, and the support of high speed data transfer protocols including isochronous and asynchronous protocols. The number of USB devices has exploded, and include keyboards, digitizers, data gloves, digital audio, video, and photographic devices, scanners, printers, CD-RW devices, DVD devices, external hard drives, modems, and new and additional devices regularly being released. For additional information on the capacity, data transfer rates, and general specification of the USB, reference is drawn to *Universal Serial Bus Specification*, Rev. 1.1, Sep. 23, 1998, and *Universal Serial Bus Specification*, Rev. 2.0, Apr. 27, 2000. Both specifications are part of the USB Implementers Forum, Inc., and are incorporated herein by reference.

For all of the many benefits and advantages to USB implementation, a deficit has emerged in the design and implementation of the USB connection port or hub through which a plurality of USB devices are connected. Typically, a USB hub is used to provide USB interface with the computer through the one or more USB ports found on the back, as well as other locations, of most recent computers, and power for each of the USB devices connected in accordance with USB standards. A typical configuration includes a USB connector, or uplink, that connects the USB port (on the computer) to the USB hub, and then a plurality of USB peripheral devices are connected one into each of the USB ports provided on the USB hub. The USB hub is constrained to be located within a few meters of the computer to which it is connected, and when multiple USB devices are connected to the USB hub, the USB hub and surroundings rapidly become a snarled tangle of wires, hub, and peripheral devices. Further, when it is desired to determine whether a specific port of the hub is functioning, or whether data is being transmitted through a particular port, such determination is not readily available in typical prior art USB hubs.

In light of the foregoing, what is needed is a USB hub that is configured for easy and efficient implementation in computer systems. The USB hub should be readily expandable to accommodate the needs of the user within the capacity of the system to which it is configured, it should be both functional as well as aesthetically pleasing, and it should be configured to avoid or prevent the tangled snarl of prior art USB hubs to enable ease of use in a plurality of implementations.

SUMMARY OF THE INVENTION

Broadly speaking, the present invention fills these needs by providing a peripheral device connection hub. In accordance with several embodiments of the present invention, the peripheral device connection hub expands the connectivity of a computer or computer system by providing an efficient and manageable hub for the connection of USB 1.1 and 2.0 devices The present invention can be implemented in numerous ways, including as a process, an apparatus, a system, a device, and a method. Several embodiments of the present invention are described below.

In one embodiment, a hub for expanding peripheral device connectivity in a computer system is disclosed. The hub includes a hub body. The hub body includes a front side, a back side, and peripheral surfaces. The peripheral surfaces include a top peripheral surface, a bottom peripheral surface and a pair of side peripheral surfaces. The hub further includes a plurality of connection ports defined in the bottom peripheral surface. Each of the plurality of connection ports enables the connection of cables. The hub additionally includes a stand defined by a shaft that extends between a first shaft end and a second shaft end. The first and second shaft ends are capable of attaching to the hub body at each of the pair of side peripheral surfaces to support the hub body a distance from a supporting surface The shaft has a base region for self-supporting the hub body on the supporting surface, and the shaft further includes a loop for holding the cables that extend away from the plurality of connection ports.

In another embodiment, a hub for expanding peripheral device connectivity of a computer system is disclosed. The hub includes a hub body having a front side, a back side, and peripheral surfaces. The peripheral surfaces include a top peripheral surface, a bottom peripheral surface and a pair of side peripheral surfaces. A plurality of connection ports are defined in the bottom peripheral surface Each of the plurality of connection ports enables the connection of cables. The hub further includes a connecting surface defined on the front side, and a hub foot defined on the back side. The connecting surface enables mounting of a second hub body to a first hub body. When the second hub body is connected to the first hub body, the second hub body is at an off-set from the first hub body. The off-set enables unobstructed viewing of the top peripheral surface of each of the first hub body and the second hub body.

In still a further embodiment, a modular Universal Serial Bus (USB) interface hub is disclosed. The modular USB interface hub includes a hub body which includes a connection surface on a first side, a hub foot on a second side, a plurality of connection ports on a bottom side, and a plurality of status LEDs on a top edge. The USB interface hub further includes a hub stand configured to attach to the hub body and orient the hub body in a semi-vertical orientation. The hub stand has a cable loop which is integral to the hub stand is configured to contain a plurality of cables attached to the hub body.

The advantages of the present invention are numerous. One notable benefit and advantage of the invention is expansion of computer connectivity by providing easy plug-and-play USB expansion. Embodiments of the present invention move the connection and disconnection of additional peripheral devices to a location as desired by the computer user, and with the ability to connect a plurality of both temporary and permanent devices through a single hub or modular stack of hubs.

Another benefit is the increased efficiency and functionality provided by embodiments of the present invention. The inventive cable management system organizes cables, reduces clutter, and provides for efficient organization and utilization of both temporary and permanent devices. Further, the manner in which an embodiment of the invention can be expanded by stacking or joining, provides for enhanced access to connection ports by maintaining an open and offset orientation of connection ports.

An additional benefit is the ability provided by embodiments of the present invention to observe and monitor status of each connection port on each of the USB hubs that may be utilized. The inventive arrangement of the status LEDs for each port provides visible indication of transmission and status, and is visible from a variety of angles and perspectives. When multiple USB hubs are stacked, the LEDs remain visible.

Yet another benefit is the many options for implementation from stacking, to surface stand, to wall or vertical mounting.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for a USB hub is disclosed. In preferred embodiments, the USB hub includes a modular hub body configured to connect with other hub bodies according to embodiments of the invention, and provides a plurality of USB connection ports and a corresponding plurality of status indicators for each of the USB connection ports. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
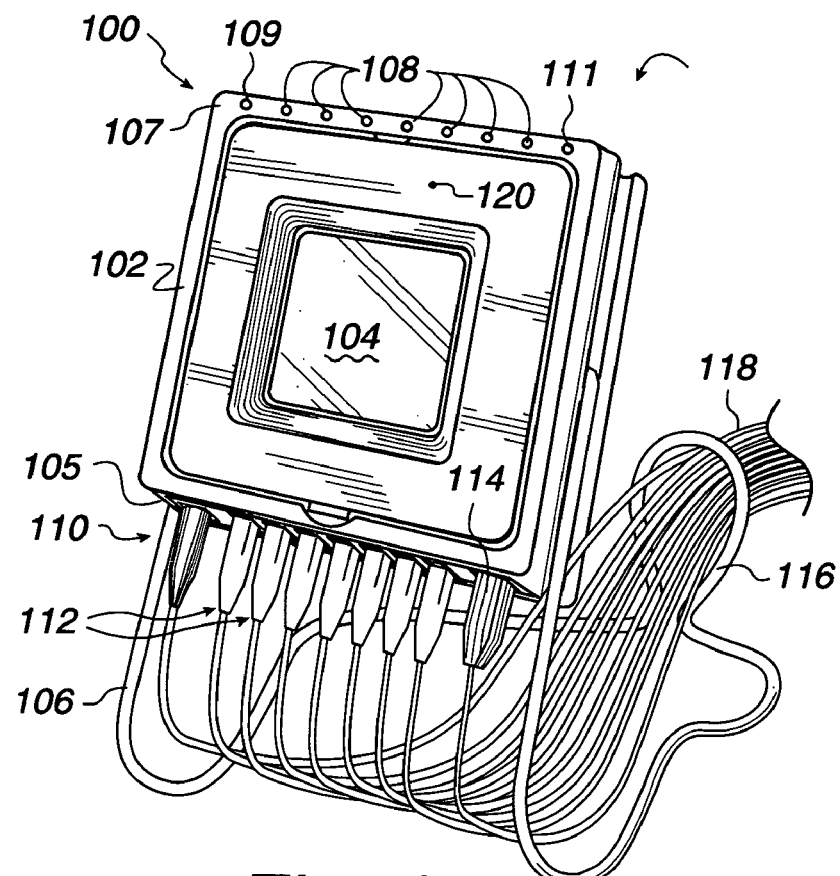
FIG. 1 shows a USB hub in accordance with one embodiment of the present invention.

FIG. 1 shows a USB hub 100 in accordance with one embodiment of the present invention. The illustrated USB hub 100 includes a hub body 102 with face plate 120 and hub stand 106. In one embodiment, hub stand 106 is configured to attach to hub body 102 and support USB hub 100 in a semi-vertical orientation. As used herein, semi-vertical is defined as generally upright, but tilted back such that the face plate 120 is easily visible, and bottom surface 105 is easily accessible for the attachment or removal of connectors as will be described in greater detail below.

In one embodiment, USB ports for USB connectors 112 are provided along bottom surface 105. Also along bottom surface 105, a USB uplink port is provided for a USB uplink connector 110, and a power port is provided for a power connector 114. Each of the ports is located on the bottom surface 105, facing downward and slightly forward with the USB hub 100 in the semi-vertical orientation. In one embodiment, four USB ports for USB connectors 112 are provided. In another embodiment, seven USB ports for USB connectors 112 are provided. In other embodiments, a plurality of USB ports for USB connectors 112 are provided according to design goals, device requirements, or personal preferences as desired.

As is known, USB connectors are standardized in accordance with the USB Specification. The versions of the USB Specification (version 1.1 and version 2.0) differ in that the later version, version 2.0, provides for the technological advancement of transmission rates, and USB 2.0 devices are rated at a significantly greater transmission rate than older USB 1.1 devices. One embodiment of the present invention is rated for USB 2.0 transmission rates, as well as supporting older USB 1.1 devices. Embodiments of the present invention, therefore provide for the transmission rates for USB 2.0 devices, while also providing for slower transmission rates in older devices. In one embodiment, both USB 2.0 and USB 1.1 devices can be connected to the same USB hub 100, and the devices will transmit data at whichever speed is appropriate for the device and for the system to which it is connected.

In one embodiment of the invention, hub body 102 includes a row of subsurface light-emitting diodes (LEDs) along an upper edge 107. The subsurface LEDs in the illustrated embodiment are within the hub body 102, do not pierce or protrude through the hub body 102, and are visible through the translucent material of the hub body 102 along the upper edge 107 when emitting light. In one embodiment, each subsurface LED is visible from both above and in front of USB hub 100 when emitting light. In alternative embodiments, LEDs are projected through a shaft, tunnel, or other protrusion through the hub body 102 to a surface mounted lens or other light cover.

Each LED across the upper edge 107 corresponds to a port across the bottom surface 105 and is essentially in line with the corresponding port located across the bottom surface 105. In FIG. 1, LED 109 corresponds to the USB uplink port with the USB uplink connector 110 illustrated. LEDs 108 correspond to USB ports having illustrated USB connectors 112, and LED 111 corresponds with power port and illustrated power connector 114. LEDs are configured to provide a visual indication of data transmission through the corresponding USB port, a visual indication of data transmission through the USB uplink, and a visual indication of power supplied to the USB hub 100.

An interchangeable face plate 120 is provided in one embodiment as will be described in greater detail below. The interchangeable face plate 120 is attached to the hub body 102 with tabs and a latch (not shown). The interchangeable face plate 120 can be quickly and easily exchanged for any of a plurality of designs, colors, patterns, and the like, according to personal preference. In one of a plurality of face plate 120 embodiments, a picture cover 104 is provided to provide visual access to a picture, sketch, photograph, and the like while providing a protective cover over the picture, sketch, photograph, and the like. A user is able to personalize the USB hub 100 with a photograph or other art work of choice, and a clear picture cover 104 provides protection. In one embodiment, face plate 120 must be removed for connecting multiple hub bodies 102 together.

In one embodiment of the present invention, hub stand 106 provides a mounting for hub body 102 that maximizes access, visibility, and functionality while minimizing clutter. By way of example, the USB hub 100 illustrated in FIG. 1 includes a USB uplink connector 110, seven USB connectors 112, and a power connector 114. Hub stand 106 supports hub body 102 in a semi-vertical position a short distance above the surface upon which the USB hub 100 is positioned. In one embodiment, the USB hub 100 is about 3.5 inches above the surface upon which it is positioned. The semi-vertical positioning provides ready and easy access to the connection ports across the bottom surface 105, enhances the visibility of the face plate 120 and picture cover 104, and maintains visibility of the LEDs across the upper edge 107. Clutter is minimized by collecting the wires 118 from the various connectors into the cable loop 116 integrally provided in hub stand 106.

Figure 2:
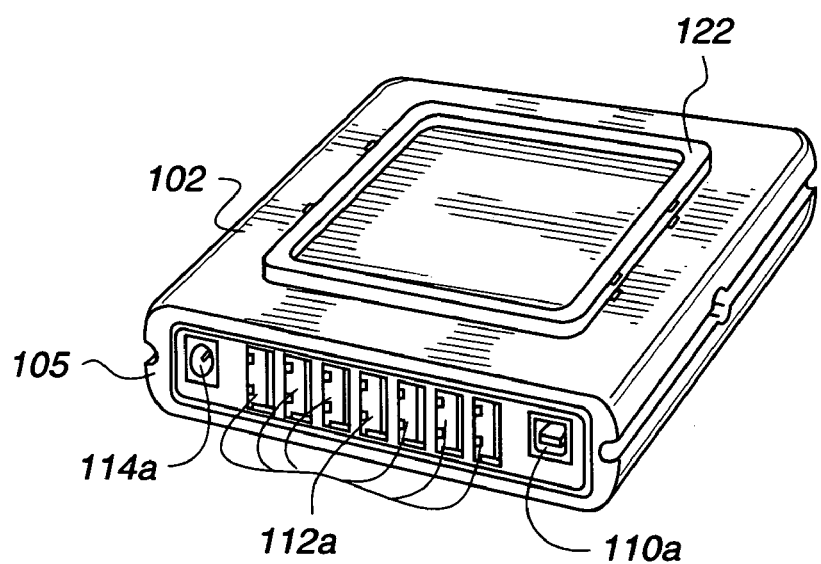
FIG. 2 shows an opposite side of the hub body illustrated in FIG. 1 in accordance with one embodiment of the present invention.

FIG. 2 shows an opposite side of the hub body 102 illustrated in FIG. 1 in accordance with one embodiment of the present invention. In the illustrated embodiment, the bottom surface 105 of hub body 102 is shown including power port 114a, seven USB ports 112a, and USB uplink port 110a. In one embodiment, hub foot 122 is provided for supporting hub body 102 when positioned flat or directly on a surface. In another embodiment, hub foot 122 is provided for connecting to another hub body 102, as will be described more fully below in reference to FIGS. 4A–4C.

Figure 3:
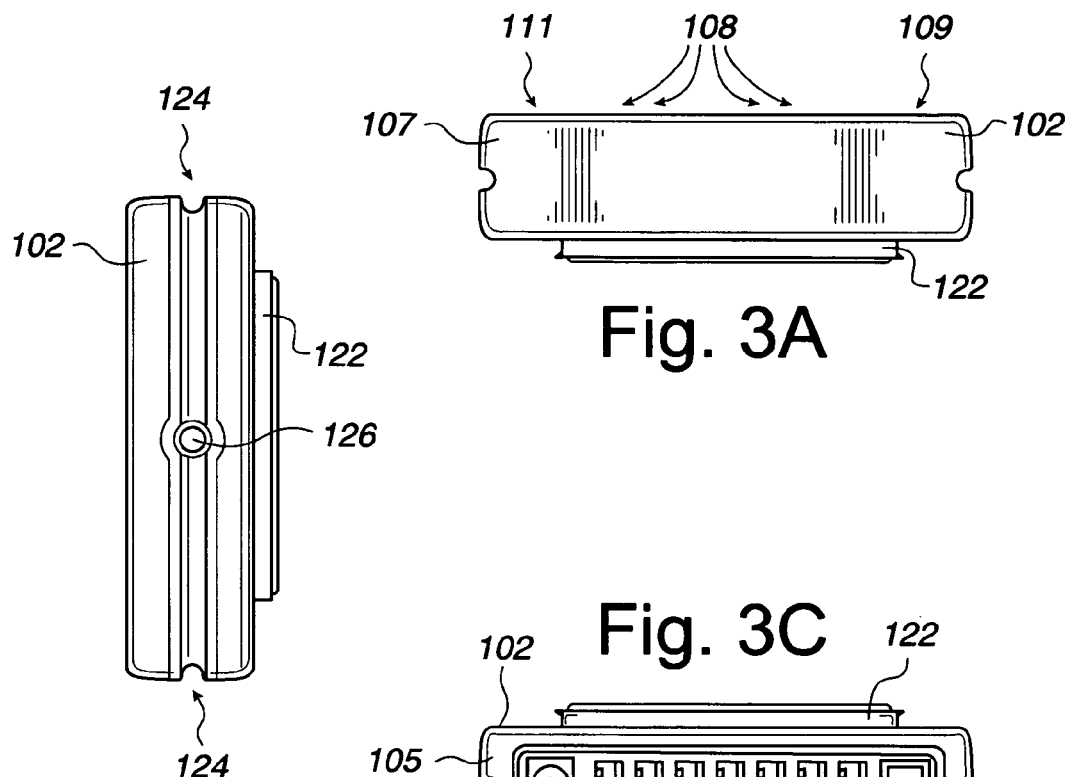
FIG. 3A shows a top edge of the hub body illustrated in FIG. 1 in accordance with one embodiment of the invention.
FIG. 3B shows a side edge of the hub body illustrated in FIG. 1 in accordance with one embodiment of the invention.
FIG. 3C shows a bottom surface of the hub body illustrated in FIG. 1 in accordance with one embodiment of the invention.
FIG. 3D shows a bottom surface of the hub body illustrated in FIG. 1 in accordance with another embodiment of the invention.

FIGS. 3A–3D show top, side, and bottom surfaces of the hub body 102 illustrated in FIG. 1 in accordance with one embodiment of the invention. In FIG. 3A, the upper edge 107 of hub body 102 is shown. Hub foot 122 is shown extending from the hub body 102. In one embodiment of the invention, LEDs corresponding to connection ports are included, under the surface of the hub body 102 at upper edge 107, and generally directed out from a front surface along the upper edge 107. In this manner, LEDs are generally visible from both above and in front of the USB hub 100. In one embodiment, a power port LED is located at 111, USB port LEDs are located at 108, and a USB uplink LED is located at 109.

In FIG. 3B, a side edge of the hub body 102 is shown. Hub foot 122 is shown extending out from the hub body 102. Also visible is track 124 into which hub stand 106 (not shown) is positioned for attachment to the hub body 102, and locking bore 126 into which an end of the hub stand 106 (not shown) is inserted to affix the hub stand 106 to the hub body 102.

FIG. 3C shows a bottom surface 105 of the hub body 102 in accordance with one embodiment of the invention. In the embodiment illustrated in FIG. 3C, seven USB ports 112a are configured across the bottom surface 105, as well as a power port 114a and a USB uplink port 110a. Also shown is the hub foot 122, which extends outward from hub body 102.

FIG. 3D illustrates a bottom surface 105 of the hub body 102 in accordance with another embodiment of the invention. In the embodiment illustrated in FIG. 3D, four USB ports 112a are configured across the bottom surface 105, as well as a power port 114a and a USB uplink port 110a. Hub foot 122 is visible extending outward from hub body 102.

Referring to FIGS. 1–3D, one embodiment of USB hub 100 is about four inches to about five inches in height (illustrated as side edge in FIG. 3B), with a preferred embodiment of about four and one half inches, and about four inches to about five inches in width (illustrated as top edge 107 and bottom surface 105), with a preferred embodiment of about four and one half inches. One embodiment of the hub body 102 is about one inch to one and one half inches in depth, not including the hub foot 122, with a preferred embodiment of about one and one quarter inches. In one embodiment of the hub foot 122, a distance out from the hub body 102 that the hub foot 122 extends ranges from about one inch to about one and one half inches, with a preferred embodiment of about one and one quarter inches.

One embodiment of hub body 102 is constructed generally of frosted plastic, acrylic, or other similar durable, light weight, and translucent material that is easily molded or cast into the desired form, is inexpensive and readily available, and can be fabricated into an aesthetically pleasing design and surface. In one embodiment, the translucent characteristic of the hub body 102 material provides for the projection of the LEDs through the surface of the hub body 102.

In one embodiment, aluminum, brushed aluminum, stainless steel, or other similar material is used along bottom surface 105 as illustrated in FIGS. 3C and 3D for necessary structural support and strength, lightness of weight, and ease of manufacture to define the openings for connection ports 110a, 112a, 114a. Aluminum, or brushed aluminum is also used, in one embodiment, to construct the interchangeable face plate 120. In other embodiments, interchangeable face plate 120 is constructed of stainless steel, acrylic, plastic, or other similar material. Hub stand 106, in one embodiment, is constructed of steel, and in one embodiment, hub foot 120 is formed of silicone to provide a secure and stable footing for USB hub 100. In one embodiment, hub foot 122 is fabricated as a ridge on the surface of hub body 102 with a groove fabricated therein. Silicone or other similar material is inserted into the groove to provide both cushion and security. Even on flat, smooth surfaces, silicone will generally provide a non-slip, secure footing for USB hub 100. The ridge of the hub foot 122 includes tabs or latches for joining with the connecting surface when stacking two or more USB hubs 100.

Figure 4:
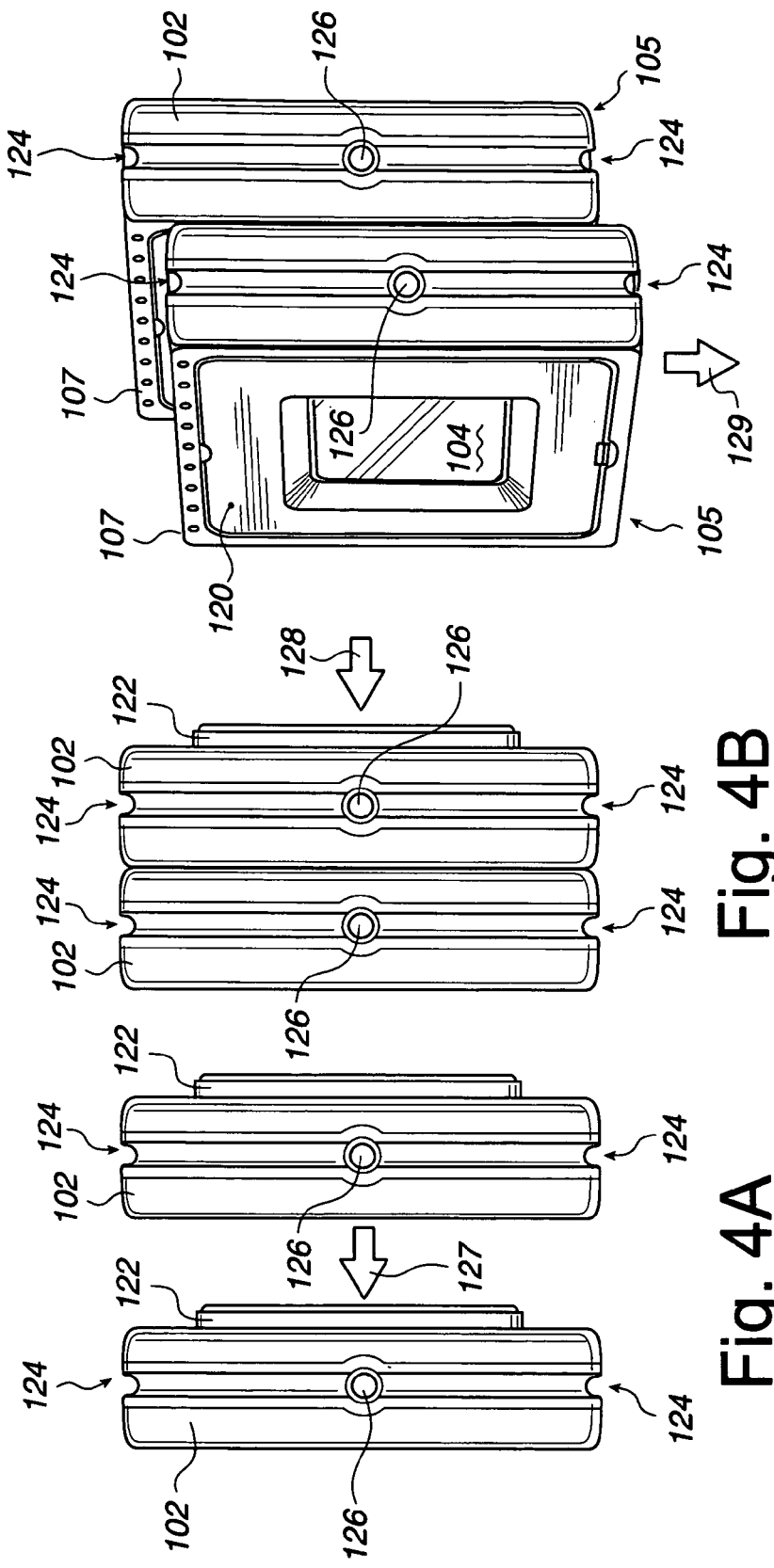
FIG. 4A shows two hub bodies positioned in the same orientation in preparation for stacking the hub bodies in accordance with one embodiment of the invention.
FIG. 4B shows two hub bodies that have been joined in accordance with one embodiment of the invention.
FIG. 4C shows the final step of stacking or joining two hub bodies in accordance with one embodiment of the invention.

Having described the general structure of the USB hub 100 in accordance with various embodiments of the present invention, several inventive features will now be described. FIGS. 4A–4C illustrate the stackability feature of hub body 102 in accordance with one embodiment of the invention. Generally, one embodiment of the present invention provides for joining, or stacking, two or more hub bodies 102 to form a USB connection station capable of providing USB interface for a plurality of USB devices. FIGS. 4A–4C show the joining of two hub bodies 102 to illustrate the feature, but it should be understood that more than two hub bodies 102 can be joined, that embodiments having, by way of example, four USB ports can be stacked or joined with other embodiments having four USB ports and with embodiments having seven USB ports, and any other combination of embodiments of the present invention as desired. In accordance with one embodiment of the invention, up to three hub bodies 102 having any combination of USB ports can be stacked or joined together and then positioned in a hub stand 106 (see FIGS. 1, 5), or hub hangar (see FIG. 6), and essentially any desired number of hub bodies 102 can be stacked or joined together and then positioned on a flat surface supported on hub foot 122.

Turning to FIG. 4A, in one embodiment of the invention, two hub bodies 102 are positioned in the same orientation. In FIGS. 4A and 4B, two hub bodies 102 are shown from a side view (see FIG. 3B) with prominent features identified including hub foot 122 extending out from the hub body 102, track 124 into which hub stand 106 (not shown) is positioned for attachment to the hub body 102, and locking bore 126 into which an end of the hub stand 106 (not shown) is inserted to affix the hub stand 106 to the hub body 102. In accordance with one embodiment of the invention, face plate 120 (not shown) is removed from at least one hub body 102 as hub foot 122 from one hub body 102 will be inserted into a stacking or connecting surface usually covered by face plate 122 (not shown). Once face plate 120 has been removed and the hub bodies 102 are oriented as illustrated in FIG. 4A, the hub bodies 102 are joined as indicated by arrow 127 with the hub foot 122 and ridge with tabs or latches of one hub body 102 inserted into the stacking or connection surface of another hub body 102.

In FIG. 4B, hub bodies 102 have been joined. Significant features including hub foot 122, track 124, and locking bore 126 are identified for reference. Only one hub foot 122 is visible as one hub foot 122 is inserted into a stacking or connection surface of the other hub body 102, enabling the stacking or joining of the two illustrated hub bodies 102. Arrow 128 is provided to indicate that hub bodies 102 are positioned together such that adjoining surfaces are in contact, in one embodiment of the invention.

FIG. 4C shows the final step of stacking or joining two hub bodies 102 in accordance with one embodiment of the invention. In FIG. 4C, prominent features are identified for reference including track 124, and locking bore 126. Additionally, FIG. 4C shows a top or front of a stacked hub body 102. Face plate 120 has been positioned in hub body 102, and picture cover 104 is shown. It should be noted that upper edge 107 is visible on both of the stacked hub bodies 102 shown in FIG. 4C. In accordance with one embodiment of the present invention, the final step in stacking or joining two (or more) hub bodies 102 includes the positioning of the hub bodies 102 into a locked position as indicated by arrow 129. The illustrated movement locks the hub foot (not shown) within the positioning surface (not shown), and provides for each upper edge 107 of each hub body 102 in the stack of hub bodies 102 to be exposed. In one embodiment, LEDs (not shown) within the upper edge 107 of each hub body 102 stacked or joined as illustrated and described are visible from both in front of and above the hub body 102. Further, in one embodiment, locking the stacked hub bodies 102 as described provides for separation and easy access to each of the ports on the bottom surface 105 of each hub body 102. The locking of the stacked hub bodies 102 positions each row of ports of a hub body 102 offset from the row of ports on the hub body 102 to which it is locked. The offset positioning and orientation enhances accessibility by providing more room for connection and disconnection at the ports, and enhances organization and efficient implementation of USB connections. Further, the LEDs are offset, thereby enhancing their visibility.

Figure 5:
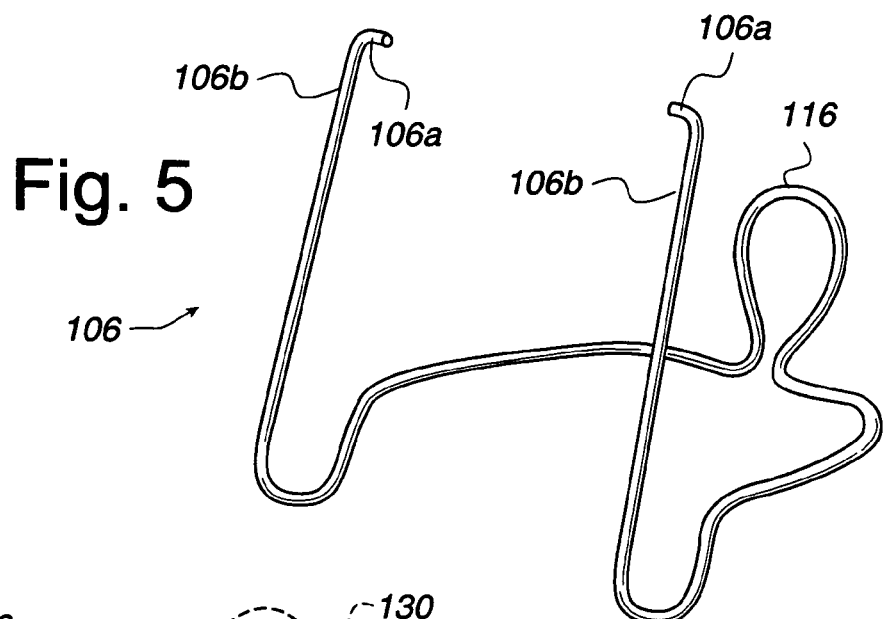
FIG. 5 shows a hub stand in accordance with one embodiment of the present invention.

FIG. 5 shows a hub stand 106 in accordance with one embodiment of the present invention. The illustrated hub stand 106 includes stand locking pins 106a which are the terminal ends of the single shaft or rod that is formed into the hub stand 106, and are configured to be inserted into the hub body 102 (see FIGS. 4A–4C) at locking bore 126 (see FIGS. 4A–4C). In alternative embodiments, hub stand 106 is configured to be attached to hub body 102 with screws, hooks and eyes, or other such affixing methods and devices. In the illustrated embodiment, hub stand upper ends 106b are configured to be positioned along and within track 124 along either side of hub body 102 (see FIGS. 4A–4C).

In one embodiment, a cable loop 116 is integrated into the hub stand 106. Cable loop 116 is configured to hold any cables that may be routed to USB hub 100 (see FIG. 1). Such cables include USB connector cables, USB uplink cables, power cables, and the like. In one embodiment, the integration of the cable loop 116 into the hub stand 106 reduces clutter and increases functionality by enhancing the organization of and the access to the USB hub 100 (see FIG. 1) and any related, associated, or connected devices.

Figure 6:
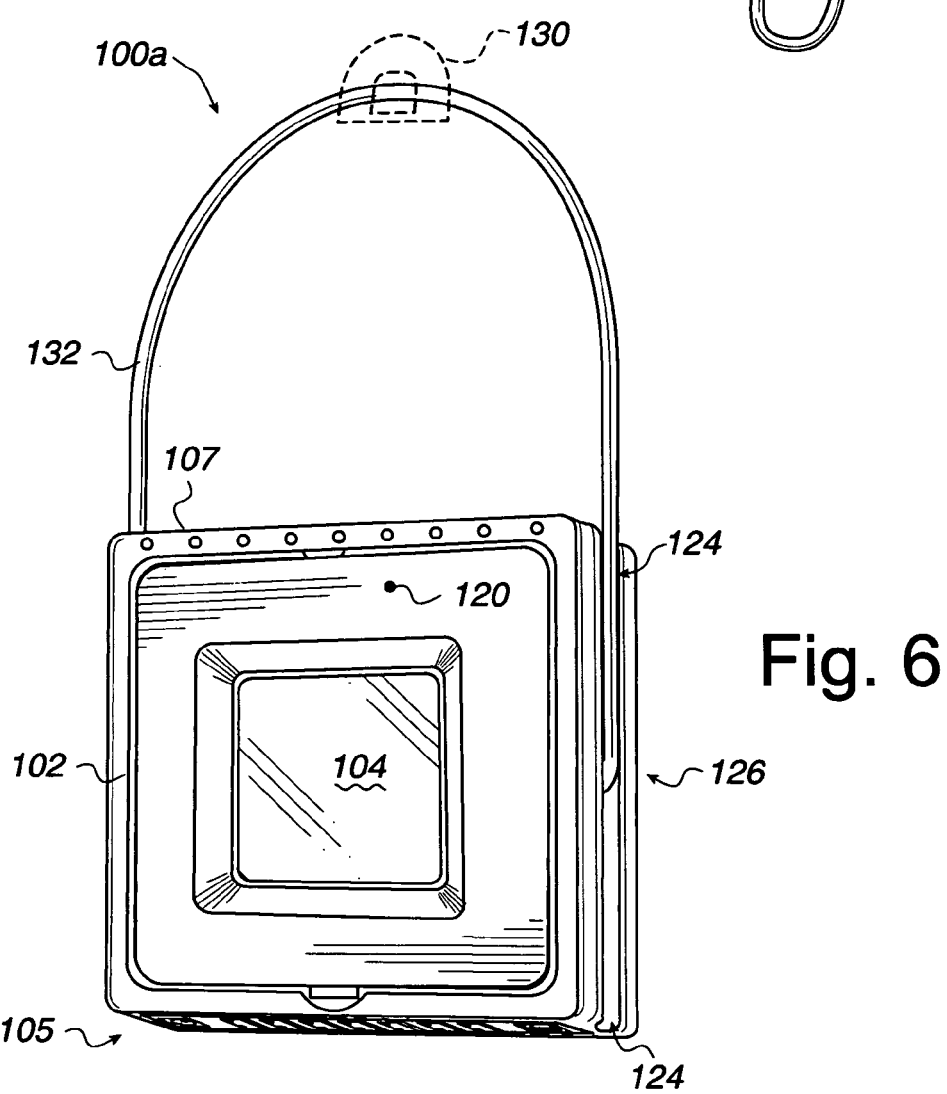
FIG. 6 illustrates a USB hub in accordance with another embodiment of the present invention.

FIG. 6 illustrates a USB hub 100a in accordance with another embodiment of the present invention. In the embodiment illustrated in FIG. 6, USB hub 100a includes a hub body 102 suspended by a hub hangar 132. Hub body 102 is essentially the same hub body 102 as the various embodiments illustrated and described above, and includes face plate 120, an upper edge 107 with subsurface LEDs visible along the upper edge 107 from both above and in front of USB hub 100a. Bottom surface 105 includes ports (not shown) for power, USB uplink, and USB connection interface (not shown). In one embodiment, hub hangar 132 is configured to be inserted into hub body 102 at locking bore 126. Similar to the hub stand 106 (see FIG. 5), hub hangar 132 is fabricated of a single shaft or rod, and terminal ends fabricated as locking pins (not shown) to be inserted into locking bore 126 on each side of hub body 102. As illustrated in the embodiment shown in FIG. 6, hub hangar 132 is further configured to be positioned within track 124 between locking bore 126 and the end of the hub body 102. In alternative embodiments (not shown), hub hangar 132 is attached to hub body 102 by screws, hooks and eyes, or other similar manner of attachment.

A clip 130 is shown for attaching the USB hub 100a to a wall or other similar surface. In one embodiment, USB hub 100a is positioned adjacent to a computer on a wall, divider, cubicle, computer stand, side or other vertical surface of a desk, and the like, and the cables can be routed as desired, similar to that as described above. Also shown in FIG. 6 are an attached face plate 120, and a photo cover 104.

Figure 7:
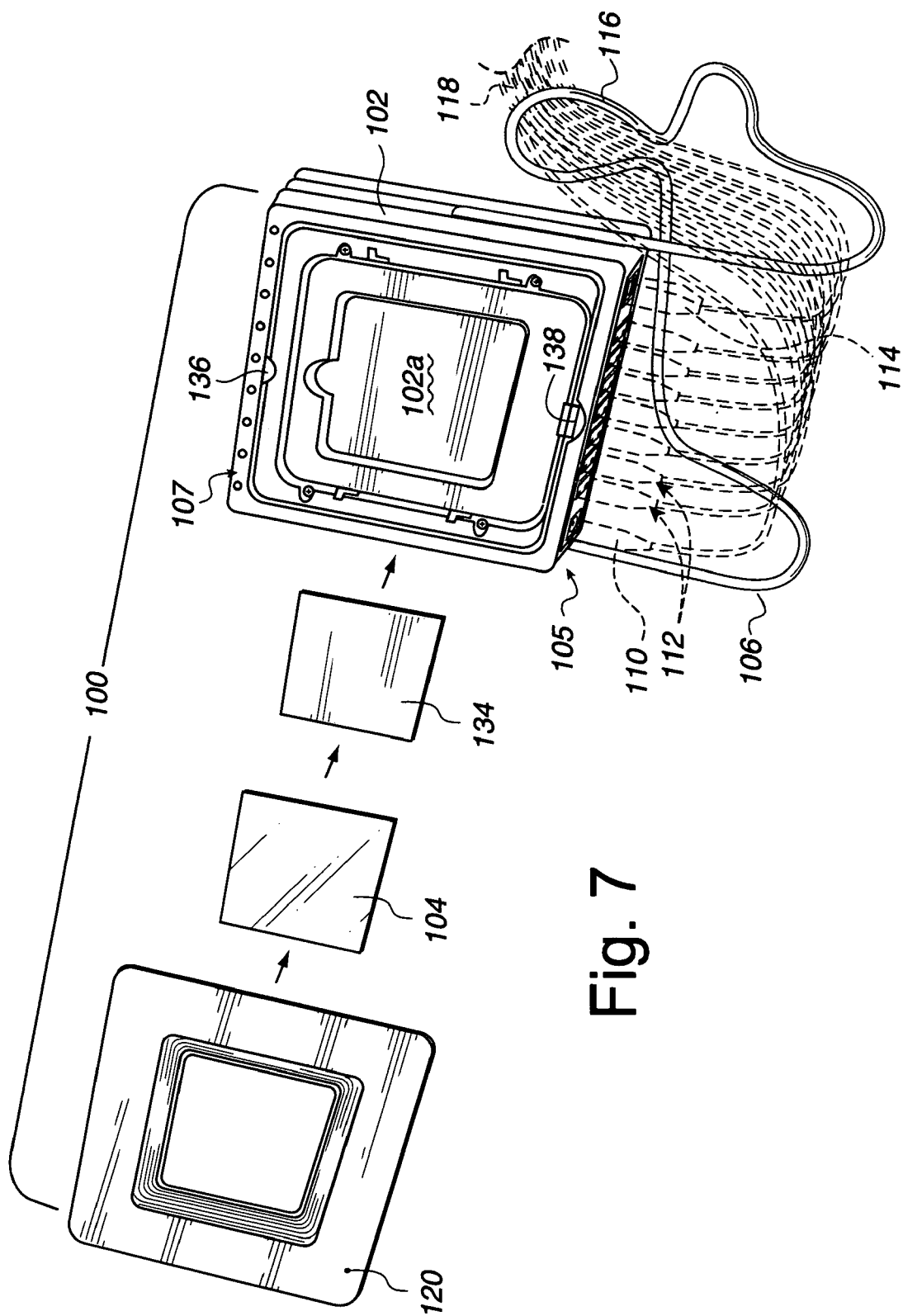
FIG. 7 shows a USB hub in accordance with another embodiment of the invention.

FIG. 7 shows a USB hub 100 in accordance with another embodiment of the invention. In the partially exploded view of FIG. 7, the attachment of a face plate 120 with a photo cover 104, and a photo, sketch, or other artwork 134 is shown. In the illustrated embodiment, the USB hub 100 is personalized by a user with a personal photo, drawing, sketch, or some other desired artwork 134, which is positioned in a hub body recess 104a configured to receive the photo or other artwork 134. Photo cover 104 is positioned over the photo or other artwork 134, and the face plate 120 is positioned in hub body 102 holding photo cover 104 and photo or other artwork 134 in place. In one embodiment, a tab 136 is provided to receive an edge of the face plate 120, and a latch 138 secures the face plate 120 in place. The tab 136 and latch 138 configuration provides for quick and easy removal of the face plate for stacking, and for customizing the look of the USB hub 100 with personal photos, pictures, or other artwork, as well as alternative patterns, designs, colors, and the like for the face plate 120.

Also shown in the embodiment illustrated in FIG. 7 are upper edge 107 under which are positioned the LEDs (not shown in FIG. 7) that light to indicate data transmission or status as appropriate for the corresponding port as described above in reference to FIG. 1. A USB uplink connector 110, seven USB connectors 112, and a power connector 114 are shown connected to the bottom surface 105 of the USB hub 100. Hub body 102 is positioned in a hub stand 106, and the cables 118 connected to the USB hub 100 are routed neatly away from the USB hub 100 which is oriented in a semi-vertical orientation providing easy access to each of the port connections on the bottom surface of the USB hub 100, and maximum visibility of each of the recessed LEDs (not shown).

In the embodiment illustrated in FIG. 7, a single hub body 102 is positioned in hub stand 106, and all associated cabling 118 is routed away from the USB hub 100 through cable loop 116. As described in greater detail above in reference to FIGS. 4A–4C, additional embodiments of the present invention include stacking or joining multiple hub bodies 102 to provide a greater number of USB interface connections through the same hub. As is known, USB can accommodate connection of up to 127 devices, although, as a practical matter, space and implementation constraints render this unlikely. One embodiment of the present invention provides for systematic and efficient organization of multiple USB devices. By way of example, USB devices used in temporary or transient implementations such as MP3 players, joy sticks, digital cameras, and the like, which are also known as "walk-up devices" can be configured to USB connections furthest away from the cable loop 116, in stacked configurations, so that their associated USB port connections are on the front-most hub body 102, and the most accessible for connection and disconnection. Similarly, the more permanent devices such as larger drives, printers, scanners, and the like, can be configured to the hub body 102 closest to the cable loop 116, in stacked configurations, and while the port connections remain accessible, they are essentially in the more distant layers of hub bodies 102. As described above in reference to FIGS. 4A–4C, in one embodiment of stacking hub bodies 102, when the hub bodies are locked into place, the rows of ports on each hub body 102 are offset. The offset rows of ports provide enhanced access by allowing greater room for connecting and disconnecting port connectors, as well as enhancing the organization of the stacked USB hub 100.

The cabling 118 associated with the more permanent USB devices can be routed through the cable loop 116 to a permanent or semi-permanent location for the USB device. The walk-up device cabling 118 can likewise be routed through the cable loop 116, but personal preferences and repeated quick connect/disconnect of the walk-up device may dictate otherwise. Whichever of the multiple embodiments, and however implemented, the present invention provides for a highly organized and efficient arrangement and implementation of USB connection.

The present invention has been described and illustrated in an embodiment for use and implementation with USB devices. It should be understood that the modular peripheral device hub is applicable and can be implemented with any of a number of present and future device connection standards, protocols, and configurations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A hub for expanding peripheral device connectivity in a computer system, comprising,
    a first hub body, the first hub body comprising:
        a front side;
        a back side;
        a top peripheral surface;

a bottom peripheral surface;

a pair of side peripheral surfaces;

a connecting surface defined on the front side, the connecting surface enabling mounting of a second hub body to the first hub body; and a hub foot defined on the back side, a plurality of connection ports defined in the bottom peripheral surface, each of the plurality of connection ports enabling connection of cables; and a stand being defined by a shaft that extends between a first shaft end and a second shaft end, the first and second shaft ends capable of attaching to the hub body at each of the pair of side peripheral surfaces to support the hub body a distance from a supporting surface, the shaft having a base region for self-supporting the hub body on the supporting surface, and the shaft further including a loop for holding the cables that extend away from the plurality of connection ports, wherein when the second hub body is connected to the first hub body, the second hub body is at an off-set from the first hub body, the off-set enabling unobstructed viewing of the top peripheral surface of each of the first hub body and the second hub body.

2. The hub for expanding peripheral device connectivity in a computer system as recited in claim 1, further comprising:

a plurality of LED indicators located along the top peripheral surface of each of the first hub body and the second hub body, each of the plurality of LED indicators aligned with and providing visual status indication for each of the plurality of connection ports defined in the bottom peripheral surface.

3. The hub for expanding peripheral device connectivity in a computer system as recited in claim 1, wherein the plurality of connection ports defined in the bottom peripheral surface includes a power connection port, a USB uplink connection port, and four USB device connection ports.

4. The hub for expanding peripheral device connectivity in a computer system as recited in claim 1, wherein the plurality of connection ports defined in the bottom peripheral surface includes a power connection port, a USB uplink connection port, and seven USB device connection ports.

5. The hub for expanding peripheral device connectivity in a computer system as recited in claim 1, wherein the plurality of connection ports defined in the bottom peripheral surface include USB connection ports, and the peripheral devices include USB 1.1 and USB 2.0 devices.

6. The hub for expanding peripheral device connectivity in a computer system as recited in claim 1, further comprising:

a face plate configured to attach to the front side and over the connecting surface and being interchangeable with a plurality of face plate designs and patterns, wherein the face plate is configured to attach over the connecting surface if another hub is not mounted to the connecting surface.

7. A hub for expanding peripheral device connectivity of a computer system, comprising:

a hub body, the hub body having a front side, a back side, and peripheral surfaces, the peripheral surfaces including a top peripheral surface, a bottom peripheral surface and a pair of side peripheral surfaces;

a plurality of connection ports defined in the bottom peripheral surface, the plurality of connection ports including USB connection ports, each of the plurality of connection ports enabling connection of cables;

a connecting surface defined on the front side, and a hub foot defined on the back side, the connecting surface enabling mounting of a second hub body to a first hub body, the first hub body being the hub body; and a stand being defined by a shaft that extends between a first shaft end and a second shaft end, the first and second shaft ends capable of attaching to the hub body at each of the pair of side peripheral surfaces to support the hub body a distance from a supporting surface, the shaft having a base region for self-supporting the hub body on the supporting surface, and the shaft further including a loop for holding the cables that extend away from the plurality of connection ports, wherein peripheral device connectivity includes peripheral devices that are USB 1.1 and USB 2.0 devices, and wherein when the second hub body is connected to the first hub body, the second hub body is at an off-set from the first hub body, the off-set enabling unobstructed viewing of the top peripheral surface of each of the first hub body and the second hub body.

8. The hub for expanding peripheral device connectivity of a computer system as recited in claim 7, further comprising:

a hangar being defined by a shaft that extends between a first shaft end and a second shaft end, the first and second shaft ends capable of attaching to the hub body at each of the pair of side peripheral surfaces to support the hub body in a vertical orientation.

9. The hub for expanding peripheral device connectivity of a computer system as recited in claim 7, wherein the first hub body and the second hub body include a plurality of LED indicators along the top peripheral surface, each of the plurality of LED indicators being aligned with and configured to indicate a status of each of the plurality of connection ports defined in the bottom peripheral surface.

10. The hub for expanding peripheral device connectivity of a computer system as recited in claim 7, wherein the plurality of connection ports include a power connection port, a USB uplink connection ports, and four USB device connection ports.

11. The hub for expanding peripheral device connectivity of a computer system as recited in claim 7, wherein the plurality of connection ports include a power connection port, a USB uplink connection ports, and seven USB device connection ports.

12. A modular Universal Serial Bus (USB) interface hub, comprising:

a hub body including, a connection surface on a first side;

a hub foot on a second side;

a plurality of connection ports on a bottom side; and a plurality of status LEDs on a top edge;

a hub stand configured to attach to the hub body and orient the hub body in a semi-vertical orientation, the hub stand having a cable loop configured to contain a plurality of cables attached to the hub body, the cable loop being integral to the hub stand.

13. The modular USB interface hub as recited in claim 12, wherein the hub body is a first hub body and the modular USB interface hub includes a second hub body joined with the first hub body, the hub foot of the second hub body being attached to the connection surface of the first hub body.

14. The modular USB interface hub as recited in claim 12, further comprising:

a face plate configured to attach to the hub body over the connection surface and further configured to be interchangeable with a plurality of faceplate designs and patterns, wherein the face plate is configured to attach over the connection surface if no hub foot is attached to the connection surface.

15. The modular USB interface hub as recited in claim 12, wherein the hub body is constructed of translucent frosted plastic.

16. The modular USB interface hub as recited in claim 13, wherein when the second hub body joins with the first hub body the first and second hub bodies are offset and the plurality of status LEDs on each of the first and the second hub bodies are offset and unobstructed.

17. The modular USB interface hub as recited in claim 13, wherein when the second hub body joins with the first hub body the first and second hub bodies are offset and the plurality of connection ports on each of the bottom sides of the first and the second hub bodies are offset and unobstructed.

* * * * *